June 7, 1927.
C. WILHELM
MOTOR VEHICLE HOOD COVER
Filed Nov. 3, 1925
1,631,663
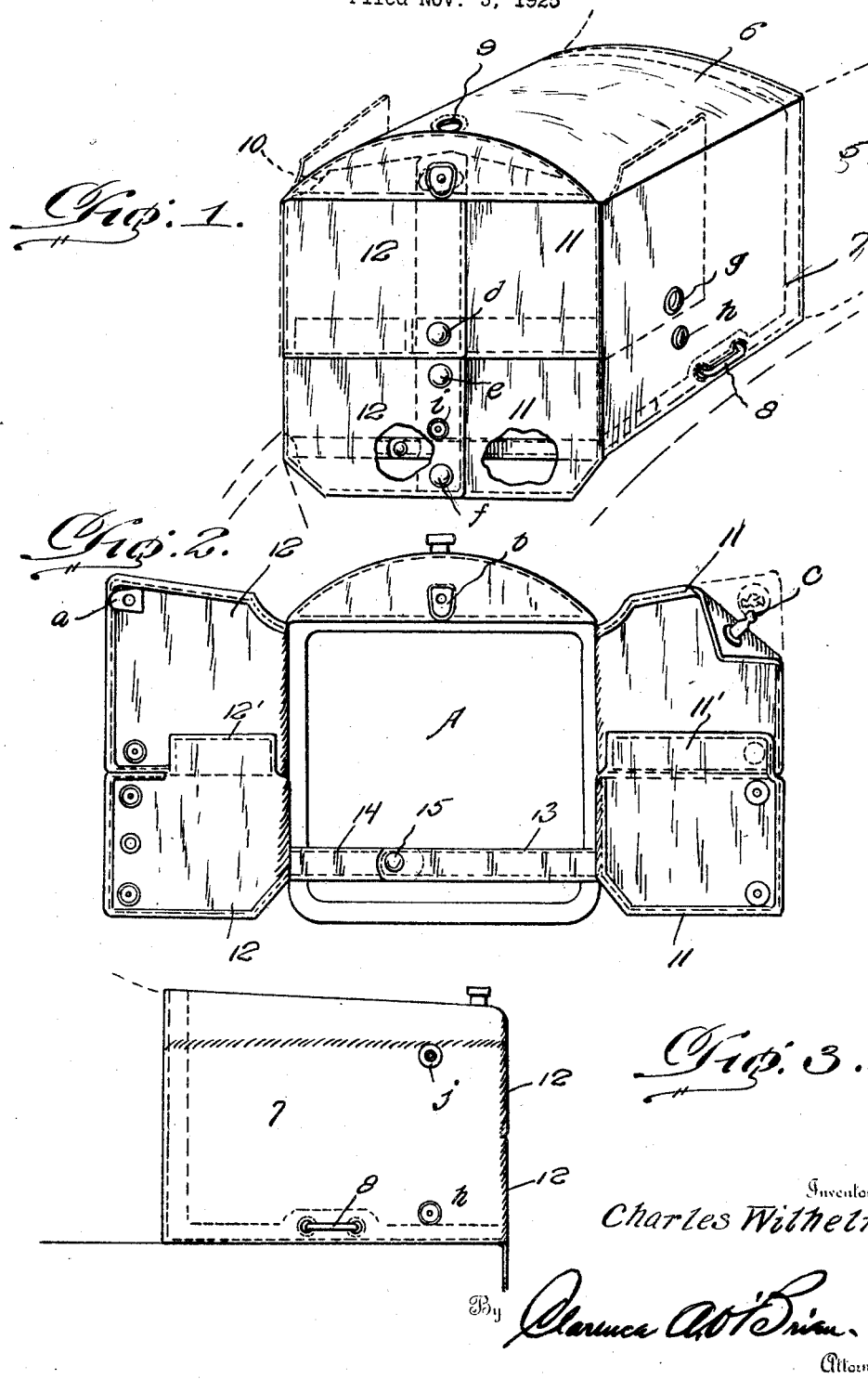

Patented June 7, 1927.

UNITED STATES PATENT OFFICE.

1,631,663

CHARLES WILHELM, OF BAYVILLE, NEW JERSEY.

MOTOR-VEHICLE HOOD COVER.

Application filed November 3, 1925. Serial No. 66,571.

This invention relates to the covers for the hoods of automobiles or other motor vehicles for maintaining the engine and radiator of the same in a relatively warm condition during the cold weather.

The primary object of an invention of this character, is to provide a hood cover of suitable fabric that may be readily associated with or removed from the hood and that when associated with the hood will entirely encase the same as well as the radiator and that may be so adjusted without great effort as to uncover the radiator in order to insure the proper functioning of the motor, during the operation of the vehicle.

A further and important object of this invention is to so construct a hood cover from relatively few fabric sections that may be folded in a flat and compact mass and to do this in a quick manner which is now practically impossible with the hood covers upon the market.

A final salient object lies in the provision of a hood cover embodying all of the above features and one that may be manufactured and marketed at low cost.

With the foregoing and other objects in view as the nature of the invention will be better understood, the same comprises the novel form, combination and arrangement of parts as hereinafter more fully described and shown in the accompanying drawing and claimed.

In the drawing wherein like reference characters indicate corresponding parts throughout the several views:—

Figure 1 is a perspective of a vehicle hood cover constructed in accordance with the present invention, certain of the structural elements being shown in dotted line position and certain others being fragmentarily shown or broken away for clearly disclosing the salient structural features of the cover.

Fig. 2 is a front elevational view of a vehicle radiator that also may be enclosed by my novel cover, the front flaps being extended in an outward open direction to clearly disclose the interior construction thereof, and Fig. 3 is a side elevation of the cover as actually associated with the vehicle hood.

Now having particular reference to the drawing my novel cover constitutes the provision of a main body designated generally at 5 that is preferably of the usual rubberized fabric or other suitable insulating material. Said body portion 5 is shaped to the general outline of a particular vehicle hood for which it is adapted and comprises a central portion 6 that in use covers the top side of the vehicle hood and side portions 7—7 that extend downwardly along the side panels of the hood as shown in Figs. 1 and 3. At the lower edges of the side portions 7—7 of said body 5, a detachable securing-means 8 may be provided for interconnecting said side portions and the side panels of the hood. I do not wish to be limited to such a detachable fastener as the side portions may be formed with suitable openings through which the hood fasteners may pass which will answer as a securing means for the cover upon the hood.

At the forward end of the central portion 6 of the main body 5, there is formed an opening 9 through which the usual filler neck of the vehicle radiator may pass. Also at the extreme forward edge of said central portion 6 of the body 5, there is formed a pendant flap or web 10 that engages downwardly alongside of the outer face of the upper portion of the vehicle radiator shell for maintaining the water in this portion of the radiator in a warm condition.

Formed or suitably associated with the forward ends of the side portions 7—7 of the body 5 of the hood cover are flaps 11—11, 12—12 that are adapted to be folded inwardly in overlapping relation for covering the vehicle radiator A, extension strips 11' and 12' being formed upon the upper edges of the lower flaps 11 and 12 in order that said upper flaps will have overlying relation with respect to said lower flaps at their adjacent edges for obviously providing a relatively water and air tight joint between the edges of said flaps.

The width of the upper flaps 11 and 12 are such as to enable the upper edges thereof to be tucked beneath the pendant flap or web 10 of the center section 6 of the hood cover body 5 as clearly shown in Fig. 1.

Said web 10 and upper flap 12 are each provided with a female member of a well known form of separable fastener that are to receive the male member of said separable fastener and that is carried by the upper outer corner of the cooperating flap 11, said female members being designated $a$ and $b$ respectively, while said male member is designated $c$, Figs. 1 and 2, and it will be apparent that through the medium of said separable fasteners, the upper flaps 11 and 12 may be maintained in secured relation upon the radiator.

At the lower overlapping edges of the upper flaps 11 and 12 a separable fastener $d$ is provided, the members of said fastener being carried by the respective flaps in order that a detachable connection may be established at the lower portions of said upper flaps, similar fastener elements being carried by the overlapping edges of the lower flaps 11 and 12 for similar purposes, these being designated respectively $e$ and $f$.

Upon one of the side portions 7 of the hood cover body 5, there is provided a pair of separable fastener elements $g$ and $h$ in vertical spaced relation that are adapted for interconnection with the opposite members of this type of separable fastener that are carried by the flaps 11—11, when it is desired to uncover the vehicle radiator and maintain it uncovered without the necessity of removing the entire cover construction.

Upon the outer side of the foremost flap 11 adjacent the vertical edge is one member $i$ of a separable fastener construction that may be associated with the opposite member $h$ of the fastener construction that is attached to the opposite side portion 7 of the cover body from that shown in Fig. 1, which carries the members $g$ and $h$. Also this side portion carries at its upper edge in vertical alinement with the member $h$, a member $i$, of a separable fastener construction for interconnection with the member $a$ of the uppermost flap 12 when said flap is folded along the side portion of the body as shown by the dotted lines in Fig. 1.

It will be at once apparent that by the provision of the flaps 11—11 and 12—12 together with their particular fastening means, the upper or lower portion of the radiator may be uncovered as desired for allowing the air to reach the same when the weather is but moderately cold.

In addition to the means that may be employed for securing the hood cover to the side panels of the radiator and especially when the flaps 11—11, 12—12 are in open position, I provide strap sections 13 and 14 that are respectively connected at their inner ends to the side portions 7—7 of the cover body 5 at the lower portion thereof that may be extended across the radiator and interconnected by a suitable separable fastener 15, Fig. 2.

From the foregoing description when considered in conjunction with the accompanying drawings, it will at once be apparent that I have provided a highly novel and relatively simple form of vehicle radiator cover that will effectively maintain the motor and radiator in a warm condition for a relatively great length of time and one that may be readily associated with or removed from the hood and radiator as well as one that may be easily and quickly placed into a flat folded condition for storage while not in use.

Even though I have herein shown and described the most preferred embodiment of the invention with which I am at this time familiar, it is nevertheless to be understood that minor changes may be made in the invention without departing from the spirit and scope of the appended claims.

Having thus described my invention, what I claim as new and desire to secure by Letters Patent is:—

1. An automobile hood cover comprising a body including an arched top shaped to conform to the top of the hood and radiator, a pair of depending side walls to cover the sides of said hood, a web depending from the forward end of said top, a pair of swingably mounted radiator flaps carried by the forward ends of the side walls, the adjacent edges of said flaps being disposed in overlapping relation with the upper ends located beneath said web when said flaps are in operative position, and means for detachably connecting the overlapping ends of said flaps together.

2. In a radiator and hood cover of the class described, a body comprising an arched top adapted to cover the top of the radiator and hood, side walls depending from the longitudinal edges of said top, and pairs of upper and lower radiator flaps swingably connected with the forward ends of said side walls, the inner adjacent edges of the flaps of the respective pairs being disposed in overlapping relation, means detachably connecting said overlapping ends together, the upper portions of said lower flaps being provided with extensions underlying the lower end portions of the upper flaps.

3. In a radiator and hood cover, a body composed of flexible material and including a transversely arched top to cover the top of the radiator and hood, flexible side walls depending from the longitudinal edge portions of said top, a web connected with and depending from the forward end of said top, detachably connected straps connected with the lower portions of the forward ends of said side walls, and upper and lower pairs of flaps swingably connected to the forward ends of said side walls, the upper ends of the upper flaps being adapted for disposition beneath said web, the upper ends of the lower flaps being adapted for disposition beneath the lower portions of said upper flaps, and means for detachably connecting all of said flaps together in the proper relation.

In testimony whereof I affix my signature.

CHARLES WILHELM.